June 14, 1927.
M. GORDON
1,632,595
WEIGHER FOR COAL AND SIMILAR MATERIAL
Filed July 31, 1926
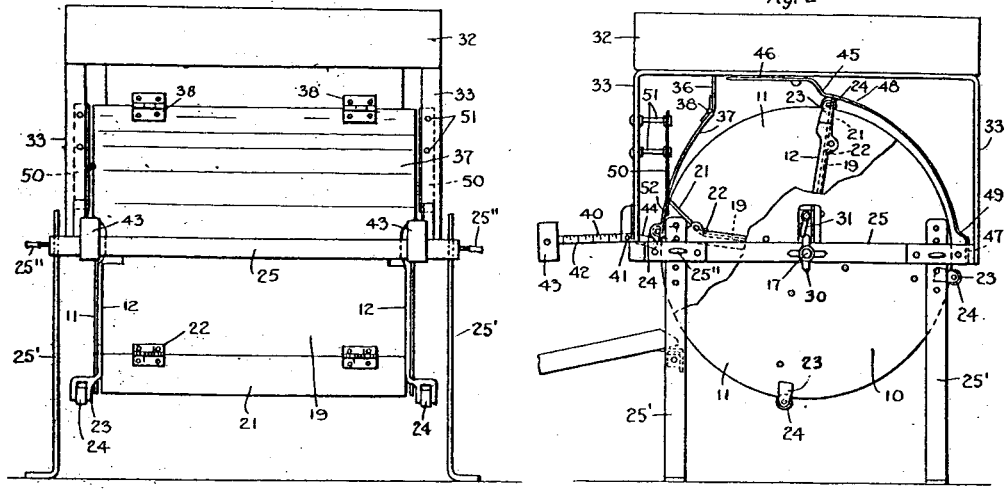
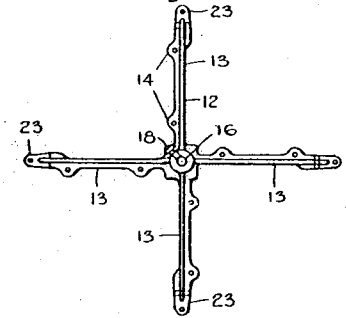
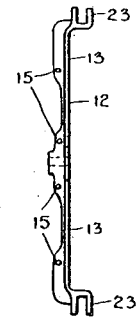
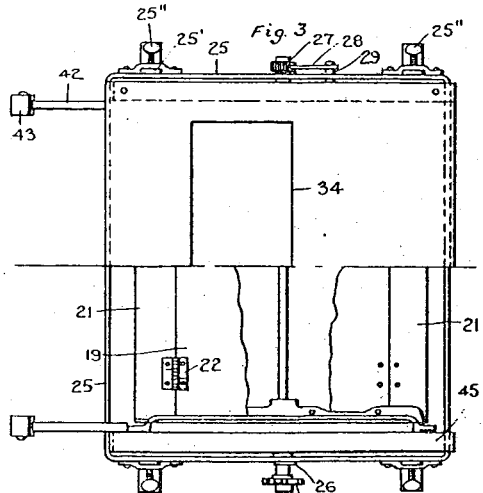
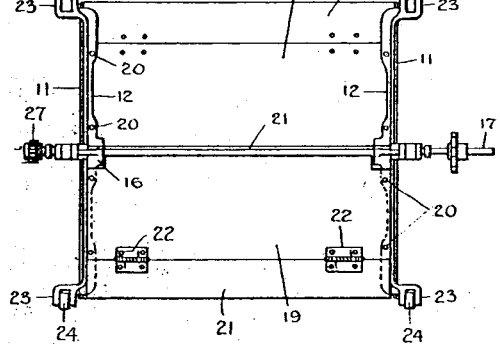
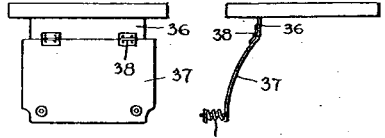
INVENTOR
Max Gordon
BY
J. T. Basseches
ATTORNEY Patented June 14, 1927.

1,632,595

UNITED STATES PATENT OFFICE.

MAX GORDON, OF PATERSON, NEW JERSEY.

WEIGHER FOR COAL AND SIMILAR MATERIAL.

Application filed July 31, 1926. Serial No. 126,259.

This invention relates generally to a weigher for coal and similar material and more particularly has for an object thereof the provision of a device whereby material, such as coal, may be weighed when loading or delivering, particularly from the coal delivery wagons or trucks now in use employing chutes or the like for dumping the material from the delivery wagon to a storage chamber or coal bin of the individual purchaser.

The invention still further has for an object thereof the provision of a weighing device for material, such as coal, useful as an accessory to the ordinary delivery wagon whereby during the process of unloading or dumping of the product, the material may be measured or weighed continuously without interfering with the delivery or unloading operation.

In its more particular embodiment, this invention has for an object thereof the provision of a weighing device suitable for coal or similar material, which includes a weighing receptacle continuously operable by the delivery of material such as coal and capable of discharging the material so weighed continuously to the hopper, chute or coal hole of the individual purchaser of the product whereby honest weight may be obtained independent of factors such as change in size of the material to be handled or the forces attendant to the momentum accompanying the delivery of a moving mass of material, such as coal, in gravitating or flowing from a storage chamber or bin or from a delivery wagon.

My invention still further has for an object thereof the provision of a weighing device for material such as coal whereby continuous delivery and weighing of coal or like material may be effected, involving a simple construction and assembly of parts and operable without any undue amount of skill, such as the class of labor employed for the delivery of merchandise of this sort.

To attain these objects and such further objects as may appear herein or be hereinafter pointed out, I make reference to the accompanying drawings forming a part hereof, in which—

Figure 1 is a side elevation of my device;
Figure 2 is an end elevation;
Figure 3 is a plan view;
Figure 4 is a plan view of a detail;
Figure 5 is an end elevation of a detail of the assembly shown in Figure 4;
Figure 6 is a side view of the detail shown in Figure 5;
Figure 7 is a side elevation of a detail;
Figure 8 is an end elevation of the detail shown in Figure 7.

Referring particularly to the drawings, my device includes a material receptacle 10 comprising circular end plates 11 mounted upon the spiders 12 comprising angularly disposed arms 13. It is preferred to make these spiders of suitably cast material with end plate lugs 14 and partition lugs 15 disposed at right angles to each other. These spiders are provided at their central portion with the boss 16 adapted to receive therein the shaft 17 and hold for rotation therewith by means of the set screw 18. For forming the receptacle, the spiders 12 are mounted on the shaft 17 and spaced from each other with the angularly disposed arms 13 in the same plane. The end plates thereupon mounted and connected thereto by suitable rivets or bolts through the lugs 14 therefor provided form a plural sectioned receptacle. The partition members 19 are disposed upon the lateral lugs 15 by suitable connection, such as rivets or bolts 20. It is preferred to make the partition members 19 with a freely movable end vane 21, secured to the partition members 19 by suitable spring hinges 22.

Preferably disposed from the plane of the spiders 12 previously described, I provide at the ends thereof suitable tripping members 23, preferably bifurcated to receive an anti-friction roller 24. The function of these extension members and the anti-friction roller will appear as the description proceeds.

The receptacle previously described is preferably rotatably mounted in the frame 25 provided with journals 26 to receive the shaft 17. This frame is further mounted upon suitable standards 25' arranged for positioning at various heights by engagement with the frame and adjustment of the set screws 25". Upon one end of the shaft 17 there is provided a ratchet wheel 27 adapted to engage a pawl 28 mounted on the frame at 29 to permit rotation only in a counter-clockwise direction, as viewed from the direction shown in Figure 2. Preferably, upon the opposite end I provide a counter trip sprocket 30 adapted to actuate the counter 31. Thus for each partial revolution, corresponding to the number of partitions, the sprocket 30 will actuate the counter 31. Preferably extending over the receptacle I provide a hopper or guard 32 held above the receptacle by the spaced supports 33. An opening 34 within the hopper is arranged to be aligned with the frontal half 35 of the receptacle. It will thus be observed that with the opening 34 extending over a partition space of the receptacle, material may be fed therethrough to the receptacle, and, due to the gravitational force, the unbalanced rotatable receptacle will be given a rotary movement.

Depending downwardly from the hopper or guard 32 and from the frontal edge 35 of the opening 34 I provide a stationary wall or baffle 36 having a portion 37 pivotally mounted thereto by means of the hinge member 38 and formed arcuately, corresponding to the circular section of the end plates 11. The lower edge of the baffle is preferably freely movable but is held in limiting action by the resilient members or spring 39 connected with the frame or supports 33. It will thus be observed that the pair of adjacent partition members 19, the oppositely disposed end walls 11 and the baffle plate 37 form a complete receptacle with a passage leading thereto from the opening 34.

To prevent other than predetermined rotation of the receptacle in a counter-clockwise direction, I provide a counterpoise or scale beam 40 pivoted at 41 in a portion of the frame, having at its outwardly disposed portions a weight arm 42, preferably graduated and provided with a suitable weight 43. The oppositely disposed end 44 of the scale beam 40 is extended to be actuated by the tripping extending members 23 previously described. It is preferred to provide duplicate scale beams at each end of the receptacle, engaging the extensions on the complementary spiders at each end. It will thus be observed that with the counter-clockwise rotation of the receptacle, the portion of the scale beam 44 will serve to retard rotation and that a predetermined quantity or weight of material may be deposited within the receptacle to hold the receptacle against further rotation until the predetermined quantity has been deposited within the chamber formed by the movable partitions 19, the end walls 11 and the fixed wall formed by the baffle 37.

To overcome the unduly free rotation of the receptacle I provide suitable braking means in the form of a resilient bar 45 having its free ends 46 and 47 attached to the hopper and frame respectively, and having an intermediate, arcuately shaped portion 48 slightly offset and including a camming face 49. This braking member is arranged to subtend a quadrant of the receptacle opposite to that in which the weighing of the material is accomplished. It will be observed that in the counter-clockwise rotation imparted to the receptacle by delivery of material through the hopper that a retarding action will be given to the receptacle by the braking member 45 which is resiliently urged against the tripping members 23 and the anti-friction roller 24 attached thereto. This free rotation will be prevented until a predetermined quantity of material has been deposited in the receptacle.

Thus, in the delivery of material through the opening 34, the rotatable receptacle will remain stationary until unbalanced by a predetermined quantity of material which is to be weighed has been delivered to the receptacle, the rotary movement being retarded by the scale beam and braking device previously described. When the predetermined quantity has been deposited within the receptacle, over-balancing the scale beam, further rotary movement will be obtained and as the extension member 23 clears the baffle plate 37, the contents thereof will be deposited upon the delivery chute, more clearly illustrated in Figure 8. At this point an extension member 23 will strike the camming surface 49 of the brake to retard the momentum of the freely rotating receptacle. A partition member 19 of the receptacle normally lying vertically disposed at that instant will serve to form the bottom of the receptacle in its continued counter-clockwise rotary movement. As the partition member reaches the horizontal positioning shown in Figure 2, the momentum due to free rotation will be retarded and for this purpose I provide a further braking member in the form of a downwardly disposed resilient arm 50, supported by suitable extension arms 51 at its upper end and adapted to engage the extension members 23 at its lower portion 52.

It will thus be observed that intermittently and continuously upon delivery of material such as coal through the opening 34 of the hopper, there will be weighed a predetermined quantity of coal or similar material by deposition thereof within the receptacle formed by the movable walls 11—11 and adjacent partitions 19. To ensure against loss of material from this partitioned space 19 I provide a hinged vane 21 which serves to ride against the baffle plate 37 without materially increasing the frictional contact. This hinged vane also serves to ensure the proper clearance of the opening 34 of the hopper when positioned vertically adjacent the hopper opening to permit of the addition of the proper quantity of material to be weighed.

It will thus be observed that I have provided a suitable accessory in the nature of a weighing device for continuously weighing material such as coal and which is particularly adapted for use with a delivery device such as coal wagons so that coal or the like may be delivered uninterruptedly and at the same time give an indication of the weight of the material delivered, without radical modification or change of the present method of delivering such merchandise.

This application is a continuation in part of my application Serial No. 103,974, filed April 22, 1926.

Having thus described my invention and illustrated its use, what I claim as new and desire to secure by Letters Patent, is—

1. A weighing device for coal or the like arranged for continuously delivering weighed quantities of material comprising a rotatable plural partitioned member, a support therefor, resiliently disposed, non-rotatable means on said support cooperating with adjacent partitions adapted to form a receptacle to receive said coal or the like and means for retarding the rotative movement of said member within limits to control the quantity of material received within the receptacle in predetermined amounts by weight.

2. A weighing device for coal or the like arranged for continuously delivering weighed quantities of material comprising a rotatable member including a plurality of partitions, a movable deflector member cooperating with adjacent partitions adapted to form a receptacle to receive said coal or the like and accommodate said partitions to variations in size of said material and means for retarding the rotative movement of said member within limits to control the quantity of material received within the receptacle in predetermined amounts by weight.

3. A weighing device for coal or the like arranged for continuously delivering weighed quantities of material comprising a rotatable member including a plurality of partitions, a deflector member, resiliently disposed, cooperating with adjacent partitions adapted to form a receptacle to receive said coal or the like and means for retarding the rotative movement of said member within limits to control the quantity of material received within the receptacle in predetermined amounts by weight.

4. A weighing device for coal or the like arranged for continuously delivering weighed quantities of material comprising a rotatable member including a plurality of partitions, a resiliently disposed deflector plate adapted to form a receptacle with adjacent partitions to receive said coal and unbalance the rotatable member by added quantities of material to be weighed, extension members on said rotatable member cooperating with means for retarding the rotative movement of said rotatable member within limits to control the quantity of material received between adjacent partitions in predetermined amounts by weight and further means cooperating with said extension members to retard the free rotative movement of said rotatable member to overcome the momentum of moving parts.

5. A weighing device for coal or the like arranged for continuously delivering weighed quantities of material comprising a rotatable member including a plurality of partitions, a resiliently disposed deflector plate adapted to form a receptacle with adjacent partitions to receive said coal and unbalance the rotatable member by added quantities of material to be weighed, extension members on said rotatable member cooperating with a scale beam assembly for retarding the rotative movement of said rotatable member within limits to control the quantity of material received between adjacent partitions in predetermined amounts by weight.

6. A weighing device for coal or the like arranged for continuously delivering weighed quantities of material comprising a rotatable member including a plurality of partitions adapted to form a receptacle to receive said coal and unbalance the rotatable member by added quantities of material to be weighed, extension members included by said rotatable member cooperating with means for retarding the rotative movement of said rotatable member within limits to control the quantity of material received between adjacent partitions in predetermined amounts by weight and means cooperating with said extension members to retard the movement of said rotatable member prior to engagement of said extension members with said first mentioned means.

7. A weighing device for coal or the like arranged for continuously delivering weighed quantities of material comprising a rotatable member including a plurality of partitions, a yielding vane included by said partitions, a deflector member cooperating with adjacent partitions and vanes included thereby adapted to form a receptacle to receive said coal or the like and means for retarding the rotative movement of said member within limits to control the quantity of material received within the receptacle in predetermined amounts by weight.

8. A weighing device for coal or the like arranged for continuously delivering weighed quantities of material comprising a rotable member including a plurality of partitions adapted to form a receptacle to receive said coal and unbalance the rotatable member by added quantities of materials to be weighed, primary means to control the quantity of material received between adjacent partitions in predetermined amounts by weight comprising resiliently disposed members and secondary means to accurately control the quantity of material received between said adjacent partitions, said secondary means comprising a weight beam engaged by means on said rotatable member.

In witness whereof I have signed this specification this 30th day of July, 1926.

MAX GORDON.